United States Patent [19]

Kamiya

[11] 4,061,693
[45] Dec. 6, 1977

[54] RESIN COMPOSITION

[75] Inventor: Shigemitsu Kamiya, Kamakura, Japan

[73] Assignee: Nippon Zeon Co. Ltd., Tokyo, Japan

[21] Appl. No.: 788,433

[22] Filed: Apr. 18, 1977

[51] Int. Cl.$^2$ .............................................. C08L 51/04
[52] U.S. Cl. ............................... 260/876 R; 260/879; 526/328
[58] Field of Search ........................... 260/876 R, 879; 526/328

[56] References Cited

U.S. PATENT DOCUMENTS

| | | | |
|---|---|---|---|
| 3,676,526 | 7/1972 | Sommerfeld | 260/876 R |
| 3,846,509 | 11/1974 | Saluti | 260/876 R |
| 3,880,951 | 4/1975 | Ooya | 260/876 R |

*Primary Examiner*—Paul R. Michl
*Attorney, Agent, or Firm*—Sherman & Shalloway

[57] ABSTRACT

An acrylonitrile resin composition capable of affording shaped articles having superior alcohol resistance, impact strength, transparency and gas-impermeability, said composition consisting essentially of (A) a resinous copolymer obtained by polymerizing a monomeric mixture consisting of (1) 60 to 90% by weight of acrylonitrile, (2) 1 to 35% by weight of at least one acrylic monomer selected from the group consisting of alkyl acrylates and alkyl methacrylates with the alkyl group containing 1 to 6 carbon atoms, and (3) 0.5 to 15% by weight of an alkyl methacrylate with the alkyl group containing 12 to 18 carbon atoms; and (B) a graft copolymer obtained by polymerizing (1) 40 to 80 parts by weight of a monomeric mixture consisting of (i) 30 to 90% by weight of acrylonitrile, (ii) 1 to 70% by weight of at least one acrylic monomer selected from the group consisting of alkyl acrylates and acryl methacrylates with the alkyl group containing 1 to 6 carbon atoms and (iii) 0 to 15% by weight of an alkyl methacrylate with the alkyl group containing 12 to 18 carbon atoms, in the presence of (2) 20 to 60 parts by weight of a diene-type rubbery polymer composed of at least 50% by weight of a conjugated diene unit and at most 50% by weight of an acrylonitrile unit, the total amount of the diene-type rubbery polymer (2) and the monomeric mixture (1) being 100 parts by weight; the ratio of the resinous copolymer (A) to the graft copolymer (B) being such that the content of the diene-type rubbery polymer used to prepare the graft copolymer (B) being 3 to 20% by weight based on the weight of the composition.

7 Claims, No Drawings

RESIN COMPOSITION

This invention relates to acrylonitrile resin compositions which can afford shaped articles having superior alcohol resistance, impact strength, transparency and gas-impermeability.

Acrylonitrile resins having a high acrylonitrile content have recently gained wide acceptance as materials for food packaging films and receptacles for carbonated drinks, alcoholic drinks, foods and cosmetics because they give shaped articles having superior gas-impermeability, stem-impermeability and impact strength.

Known acrylonitrile resins include, for example, a graft-blend type resin composition obtained by blending (I) a resinous polymer obtained by polymerizing a monomeric mixture consisting of at least 70% by weight of acrylonitrile and at most 30% by weight of at least one acrylic monomer selected from alkyl acrylates and alkyl methacrylates with the alkyl group containing 1 to 6 carbon atoms, with (II) a graft copolymer obtained by graftcopolymerizing the monomeric mixture in the presence of a diene-type rubbery polymer (see Japanese Patent Publication No. 13853/74). A similar graft-blend resin composition is also known from Japanese Laid-Open Patent Publication No. 791/73.

These graft-blend type acrylonitrile resins, however, have poor water resistance and alcohol resistance, and when used in applications which involve contact with water or alcohols or both, they tend to become cloudy with white spots. Since this phenomenon is accelerated at high temperatures, the commercial value of these resins is low.

A method was suggested in Japanese Patent Publication No. 21105/74 in which a monomeric mixture consisting of the aforesaid mixture and octyl acrylate as an additional ingredient is used to improve water resistance. The method is effective for improving water resistance, but connot achieve an improvement in alcohol resistance. This means that the alcohol resistance of an acrylonitrile resin can not be improved simultaneously by imparting water resistance to it, but a contrivance is separately required to obtain alcohol resistance.

Another disadvantage is that blow molded articles, such as bottles, prepared from these known graft-blend type acrylonitrile resins have low impact strength and transparency, and are unsatisfactory for practical application. It has been desired therefore to improve these properties.

It is an object of this invention to provide an acrylonitrile resin composition capable of affording shaped articles having superior alcohol resistance, impact strength, transparency and gas-impermeability.

According to the present invention, the aforesaid object is achieved by an acrylonitrile resin composition comprising a blend of:

A. a resinous copolymer which is obtained by polymerizing a monomeric mixture consisting of (1) 60 to 90% by weight, preferably 65 to 85% by weight, of acrylonitrile, (2) 1 to 35% by weight, preferably 5 to 30% by weight, of at least one acrylic monomer selected from the group consisting of alkyl acrylates and alkyl methacrylates with the alkyl group containing 1 to 6 carbon atoms, and (3) 0.5 to 15% by weight, preferably 1 to 10% by weight, of an alkyl methacrylate with the alkyl group containing 12 to 18 carbon atoms, and B. a graft copolymer obtained by polymerizing 40 to 80 parts by weight, preferably 40 to 60 parts by weight, of (1) a monomeric mixture consisting of (i) 30 to 90% by weight, preferably 35 to 55% by weight of acrylonitrile, (ii) 1 to 70% by weight, preferably 45 to 65% by weight, of at least one acrylic monomer selected from the group consisting of alkyl acrylates and alkyl methacrylates with the alkyl group containing 1 to 6 carbon atoms, and (iii) 0 to 15% by weight, preferably 0 to 10% by weight, of an alkyl methacrylate with the alkyl group containing 12 to 18 carbon atoms, in the presence of (2) 20 to 60 parts by weight, preferably 40 to 60 parts by weight, of a diene-type rubbery polymer composed of at least 50% by weight of a conjugated diene unit and at most 50% by weight of an acrylonitrile unit, the total amount of the monomeric mixture and the diene-type rubbery polymer being 100 parts by weight;

the components (A) and (B) being blended in such a ratio that the content of the diene-type rubbery polymer used to produce the component (B) is 3 to 20% by weight of the composition.

The amounts of the monomers constituting the resinous copolymer (A) affect the properties of shaped articles produced from the graft-blend type acrylonitrile resin composition of this invention. For example, when the amount of acrylonitrile is less than 60% by weight, the gas-impermeability of the shaped article is reduced. If it exceeds 90% by weight, the shapability of the resin composition becomes poor. If the amount of the alkyl acrylate or methacrylate with an alkyl group containing 1 to 6 carbon atoms is less than 1% by weight, the shapability of the resin composition is reduced. If it exceeds 35% by weight, the gas-impermeability of the shaped article is reduced.

The alkyl methacrylate with the alkyl group containing 12 to 18 carbon atoms, another monomer which constitutes the resinous copolymer (A), is an essential component for imparting alcohol resistance to shaped articles prepared from the graft-blend type acrylonitile resin composition of this invention and improving their transparency. A light transmission test shows that the effect of imparting alcohol resistance is larger with larger number of carbon atoms in the alkyl methacrylate. It is difficult however to discern differences in the degree of transparency by visual observation. These effects are observed when the amount of the alkyl methacrylate with the alkyl group containing 12 to 18 carbon atoms is at least 0.5% by weight based on the total amount of the monomeric mixture used to produce the resinous copolymer (A). Alcohol resistance increases with increasing amount of the alkyl methacrylate, but the degree of increase reaches saturation when the amount exceeds 15% by weight. Moreover, amounts of more than 15% by weight cause peeling in the shaped article. From the above viewpoint, the amount of the alkyl methacrylate with the alkyl group containing 12 to 18 carbon atoms is 0.5 to 15% by weight, preferably 1 to 10% by weight, more preferably 1 to 5% by weight. It is noted that if the $C_{12-18}$ alkyl methacrylate is replaced by a $C_{12-18}$ alkyl acrylate, no improvement in alcohol resistance is achieved in the shaped article, and the transparency of the shaped article is reduced.

The alcohol resistance and transparency of a shaped article prepared from the composition of this invention can be greatly improved by using the $C_{12-18}$ alkyl methacrylate as a constituent of the resinous copolymer (A). When it is desired to bring these properties to still higher levels, the same alkyl methacrylate is used as one component of a grafting monomeric component in the production of the graft copolymer (B). The amount of the alkyl methacrylate in this case is up to 15% by weight, preferably up to 10% by weight, more preferably 1 to 5% by weight, based on the weight of the entire monomeric mixture. When it is used in an amount exceeding 15% by weight, the effect of improvement reaches saturation, and it is economically disadvantageous.

Marked effects of improving the impact strength and transparency of a shaped article prepared from the graft-blend type acrylonitrile resin of this invention consisting of the resinous copolymer (A) and the graft copolymer (B) can be obtained by producing the graft copolymer (B) under controlled conditions described below having regard to the resinous copolymer (A).

Firstly, the amount of acrylonitrile in the grafting monomeric component should be limited to 30-90% by weight, preferably 35-55% by weight. Better impact strength and less yellowing can be achieved with smaller amounts of acrylonitrile within this range. When the amount of acrylonitrile is less than 30% by weight, the impact strength of the shaped article is reduced, and its surface luster becomes poor.

Secondly, the amount of the alkyl acrylate or alkyl methacrylate with the alkyl group containing 1 to 6 carbon atoms should be 1 to 70% by weight, preferably 45 to 65% by weight, for the same reason as set forth above with regard to the amount of acrylonitrile.

Thirdly, the graft copolymerization should be carried out by polymerizing 40 to 80 parts by weight of the grafting monomeric mixture in the presence of 20 to 60 parts by weight of the diene-type rubbery polymer (the total amount of the monomeric mixture and the diene-type rubbery polymer should be 100 parts by weight). The impact strength of the shaped article increases if the amounts of these components are within the specified range. If the amount of the diene-type rubbery polymer is larger than 60 parts by weight, the impact resistance and surface luster of the shaped article are reduced. If it is less than 20 parts by weight, the processability of the resulting resin composition is reduced (its flow characteristics are reduced by a rise in viscosity at the time of shaping), and the shaped article obtained has reduced impact strength and increased yellowing.

The blending ratio between the resinous copolymer (A) and the graft copolymer (B) is such that the amount of the diene-type rubbery polymer used to prepare the graft copolymer (B) is 3 to 20% by weight, preferably 5 to 20% by weight, based on the total amount of the components (A) and (B). If the content of the diene-type rubbery polymer is increased beyond 20% by weight, no corresponding effect of improving the impact strength of the shaped article can be obtained, and the resulting shaped article has reduced gas-impermeability.

The diene-type rubbery polymer, a trunk polymer used to prepare the graft copolymer (B), is an elastomer composed of at least 50% by weight, preferably 70 to 100% by weight, more preferably 70 to 95% by weight, of a conjugated diene unit such as butadiene or isoprene and at most 50% by weight, preferably 0 to 30% by weight, more preferably 5 to 30% by weight, of an acrylonitrile unit. If a polymer having more than 50% by weight of the acrylonitrile unit is used, a shaped article prepared from the resulting resin composition has reduced impact strength. In order to obtain increased impact strength, diene-type rubbery polymers having low glass transition points (Tg) are preferred.

Examples of the alkyl acrylates and methacrylates with the alkyl group containing 1 to 6 carbon atoms include methyl acrylate, ethyl acrylate, propyl acrylate, butyl acrylate, methyl methacrylate, ethyl methacrylate, propyl methacrylate, and butyl methacrylate. The alkyl methacrylate with the alkyl group containing 12 to 18 carbon atoms includes, for example, lauryl methacrylate, myristyl methacrylate, cetyl methacrylate, and stearyl methacrylate.

The resinous copolymer (A) can be prepared by known methods such as bulk polymerization, solution polymerization, suspension polymerization, or emulsion polymerization. Those which are obtained by emulsion polymerization are preferred. The graft copolymer (B) can be prepared by adding the grafting monomeric mixture to a latex of the diene-type rubbery polymer, and subjecting the mixture to graft copolymerization in a customary manner.

In the preparation of the resinous copolymer (A) and the graft copolymer (B), various polymerization initiators are used. Examples of the initiators are water-soluble initiators such as potassium persulfate, ammonium persulfate or hydrogen peroxide, oil-soluble initiators such as azobisisobutyronitrile, benzoyl peroxide or tertiary butyl peroxypivalate, and redox initiators composed of water-soluble peroxides and reducing agents. Emulsifiers that can be used in the polymerization are alkali metal salts of higher fatty acids, alkali metal salts of rosin acid, alkali metal salts of alkylbenzenesulfonic acids, alkali metal salts of esters formed between higher aliphatic alcohols and sulfuric acid, and phosphoric acid esters of higher aliphatic alcohols. These polymerizations may be carried out by a batchwise process in which the monomeric mixture and other ingredients are added either continuously or intermittently.

The resinous copolymer (A) and the graft copolymer (B) may be blended by a dry blend method or a latex blend method.

The graft-blend type resin composition of this invention so prepared can afford shaped articles having superior alcohol resistance, impact strength, transparency and gas-impermeability, and have better processability (flowability during melting) and less coloration in the shaped articles, and are required in lesser amounts in blow bottle molding, than graft-type resins having the same composition used alone.

The following Examples illustrate the present invention. Unless otherwise specified, all parts and percentages in these examples are by weight.

EXAMPLE 1

1. Preparation of Diene-Type Rubbery Polymer Latex

| Polymerization recipe for rubbery polymer (parts) | |
| --- | --- |
| Acrylonitrile | 15 |
| 1,3-Butadiene | 85 |
| t-Dodecyl mercaptan | 0.4 |
| Sodium laurylsulfate | 1.5 |
| Sodium carbonate | 0.2 |
| Cumene hydroperoxide | 0.08 |
| Ferrous sulfate heptahydrate | 0.01 |
| Dextrose | 0.05 |
| Disodium ethylenediaminetetraacetate monohydride | 0.02 |
| Water | 200 |

All of the above ingredients excepting cumene hydroperoxide were charged into an autoclave, and in an atmosphere of nitrogen, the temperature of the reaction system was adjusted to 5° C. Then, cumene hydroperoxide was added to the reaction system, and the reaction mixture was stirred for 20 hours to complete the reaction (the conversion of the monomeric mixture was 97%). A good acrylonitrile-butadiene rubbery copolymer (NBR) latex was thus obtained.

Examination of the rubbery polymer in the latex by an electron microscope showed that it consisted of particles having a uniform average particle size of 0.1 μ. The resulting latex of NBR was used to produce graft copolymers in the following Examples.

2. Preparation of Resinous Polymer (A)

An autoclave was charged with 100 parts of each of the monomeric mixtures shown in Table 1, 1.5 parts of n-dodecyl mercaptan, 0.8 part of sodium laurylsulfate, 0.2 part of anhydrous sodium pyrophosphate, 0.08 part of potassium persulfate and 200 parts of water, and with stirring in an atmosphere of nitrogen, the monomeric mixture was polymerized at 55° C for 16 hours to afford a good resinous copolymer latex. The final conversion of each of the monomeric mixtures is also shown in Table 1.

Table 1

| Resinous polymer (A) | A-(1) | A-(2) | A-(3) | A-(4) | A-(5) | A-(6) |
|---|---|---|---|---|---|---|
| Monomeric mixture | | | | | | |
| Acrylonitrile | 75 | 75 | 75 | 75 | 75 | 75 |
| Methyl acrylate | 20 | 20 | 25 | 20 | 20 | 20 |
| Lauryl methacrylate | 5 | — | — | — | — | — |
| Stearyl methacrylate | — | 5 | — | — | — | — |
| Butyl methacrylate | — | — | — | 5 | — | — |
| 2-Ethylhexyl acrylate | — | — | — | — | 5 | — |
| Stearyl acrylate | — | — | — | — | — | 5 |
| Final conversion of the monomeric mixture (%) | 96 | 95 | 96 | 95 | 95 | 94 |

3. Preparation of Graft Copolymer (B)

An autoclave was charged with 100 parts of each of the monomeric mixtures shown in Table 2, 100 parts of the acrylonitrile-butadiene rubbery copolymer (as solids content in the latex) set forth in (1) above, 0.3 part of t-dodecyl mercaptan, 0.8 part of sodium laurylsulfate, 0.2 part of anhydrous sodium pyrophosphate, 0.08 part of potassium persulfate and 600 parts of water, and with stirring in an atmosphere of nitrogen, the monomeric mixture was polymerized at 55° C for 16 hours to afford a good graft copolymer latex. The final conversion of each of the monomeric mixtures is also shown in Table 2.

Table 2

| Graft copolymer (B) | B-(1) | B-(2) | B-(3) |
|---|---|---|---|
| Monomeric mixture | | | |
| Acrylonitrile | 50 | 50 | 75 |
| Methyl acrylate | 50 | 45 | 25 |
| Lauryl methacrylate | — | 5 | — |
| Final conversion of the monomeric mixture (%) | 91 | 92 | 91 |
| Ratio of the rubbery copolymer to the grafting monomeric mixture | 50/50 | 50/50 | 50/50 |

4. Preparation and Testing of Resin Composition

The resinous polymer (A) latices set forth in (2) above and the graft copolymer (B) latices set forth in (3) above were mixed in the combinations shown in Table 3. Each of the mixed latices was treated with a 0.4% aqueous solution of aluminum sulfate to precipitate the polymer. The polymer was separated by filtration, washed with water, and dried at 60° C for 48 hours to afford a white powdery polymer. In the above mixing procedure, the amount of the rubbery copolymer was adjusted to 13% based on the total amount (solids content) of the polymers (A) and (B).

The white powdery polymer obtained was meltkneaded for 3 minutes by a heated roll at 160° C to form a sheet. The rolled sheet was pre-heated for 5 minutes and pressed for 5 minutes by a hot press kept at 170° C, followed by cooling, to afford a 1 mm-thick sheet having a surface luster.

The alcohol resistance of the press sheet was tested by the following method.

The sample sheet was dipped for 30 minutes in a 50% aqueous solution of ethyl alcohol kept at 50° C in accordance with ASTM D543-67 which specifies a test relating to chemical resistance. The sheet before and after dipping was tested in accordance with JIS K6714 for parallel ray transmittance, and the percentage of the transmittance after dipping based on that before dipping was calculated in order to evaluate any decrease in parallel ray transmittance.

The results are shown in Table 3.

Table 3

| | Resin composition | | Results of test for alcohol resistance | | |
|---|---|---|---|---|---|
| Run No. | Resinous polymer (A) | Graft copolymer (B) | Transmittance before dipping [X] (%) | Transmittance after dipping [Y] (%) | [Y]/[X] ×100 (%) |
| Invention | | | | | |
| 1 | A-(1) | B-(1) | 85 | 70 | 82.4 |
| 2 | A-(2) | B-(2) | 86 | 76 | 88.4 |
| Comparison | | | | | |
| 1 | A-(3) | B-(3) | 80 | 18 | 22.5 |
| 2 | A-(3) | B-(2) | 86 | 21 | 24.4 |
| 3 | A-(4) | B-(1) | 86 | 35 | 40.7 |
| 4 | A-(5) | B-(2) | 85 | 40 | 47.1 |
| 5 | A-(6) | B-(1) | 52 | 23 | 44.2 |

It can be seen from the above table that the sheets in Runs Nos. 1 and 2 of the invention have good transparency in the initial stage (before dipping) and high transimttance values after dipping in the alcohol, thus demonstrating superior alcohol resistance. By visual observation, the sheets of Runs Nos. 1 and 2 of the invention after dipping were transparent, and no difference in the degree of transparency could be discerned. In contrast, the sheet of comparison Run No. 5 before dipping was somewhat cloudy with white spots, and the sheets of comparison Runs Nos. 1, 2, 3, 4 and 5 after dipping were all cloudy with white spots and had markedly impaired transparency.

EXAMPLE 2

The resinous polymer (A) set forth in (2) of Example 1 and the graft copolymer (B) latex set forth in (3) of Example 1 were mixed in the combinations shown in Table 4 with the amount of the rubbery copolymer being adjusted to 8% based on the total amount (solids content) of the polymers (A) and (B). The compositions obtained were post-treated, and tested for alcohol resistance in the same way as in Example 1.

The results are shown in Table 4.

Table 4

| Run No. | Resin composition Resinous polymer (A) | Resin composition Graft copolymer (B) | Results of test for alcohol resistance Transmittance before dipping [X] (%) | Results of test for alcohol resistance Transmittance after dipping [Y] (%) | [Y]/[X] ×100 (%) |
|---|---|---|---|---|---|
| Invention | | | | | |
| 3 | A-(1) | B-(1) | 86 | 71 | 82.6 |
| Comparison | | | | | |
| 6 | A-(3) | B-(3) | 76 | 20 | 26.3 |
| 7 | A-(5) | B-(2) | 85 | 39 | 45.9 |

The results shown in Table 4 demonstrate that the sheet of Run No. 3 of the invention had good transparency in the initial stage (before dipping) and a high transmittance after dipping in alcohol, thus showing superior alcohol resistance, whereas the sheets of comparison Runs Nos. 6 and 7 after dipping were cloudy with white spots showing marked impairment of transparency.

EXAMPLE 3

An autoclave was charged with 100 parts of each of the monomeric mixtures shown in Table 5, the acrylonitrilebutadiene rubbery copolymer (as the solids content of latex) obtained in (1) of Example 1 in each of the amounts shown in Table 5, 0.3 part of t-dodecyl mercaptan [1.5 parts of n-dodecylmercaptan in the preparation of B-(6)], 0.8 part of sodium laurylsulfate, 0.2 part of anhydrous sodium pyrophosphate, 0.08 part of the potassium persulfate and water in each of the amounts shown in Table 5. With stirring in an atmosphere of nitrogen, the graft copolymerization was performed at 55° C for 16 hours to afford a good graft copolymer latex. The final conversion of each of the monomeric mixtures is shown in Table 5.

Table 5

| Polymerization recipe | Graft copolymer (B) B-(4) | B-(5) | B-(6) |
|---|---|---|---|
| Monomeric mixture | | | |
| Acrylonitrile | 35 | 50 | 71 |
| Methyl acrylate | 65 | 50 | 25 |
| Lauryl methacrylate | — | — | 4 |
| Rubbery copolymer (as solids content) | 100 | 140 | 15 |
| Water | 600 | 720 | 345 |
| Final conversion of the monomeric mixture (%) | 90 | 89 | 95 |
| Ratio of the rubbery copolymer to the grafting monomeric mixture | 50/50 | 58/42 | 13/87 |

The graft copolymer latices B-(4) and B-(5) and the graft copolymer latices B-(1) and B-(3) set forth in (3) of Example 1 were mixed with the resinous polymer latices A-(1), A-(2) and A-(3) set forth in (2) of Example 1 in the combinations shown in Table 6 so that the content of the rubbery copolymer in the resulting composition was 13% based on the resin composition (solids content). A polymer was precipitated from each of these mixed latices using a 0.4% aqueous solution of aluminum sulfate, separated by filtration, washed with water, and dried at 60° C for 48 hours to afford a white powdery polymer.

Separately, the graft copolymer latex B-(6) alone was similarly salted out, filtered, washed with water, and dried to afford a white powdery polymer.

The various properties of the resulting polymers were tested by the following methods. The results are shown in Table 6.

Impact strength

A sample white powdery polymer was pelletized using an extrusion molding machine heated at 180° C. The pellets obtained were molded into bottles each having a capacity of 300 cc using a blow molding machine. Each bottle was weighed, and then 300 g of water at 5° C was placed in the bottle. The bottles were sealed, and allowed to stand for 1 hour at 5° C. Then, the bottles were let fall perpendicular onto a flat iron plate. The height which caused 50% of the tested bottles to break was determined.

Processability

The temperature versus viscosity relation of the pellets of the polymer set forth above was measured by a Koka-type flow tester under a load of 200 kg/cm$^2$ by a temperature raising method. The temperature at which the pellets showed a melt viscosity of $10^5$ poises was made a parameter of processability.

Color

The blow bottle set forth above was cut open, and preheated for 5 minutes and pressed for 5 minutes by a hot press held at 170° C and then cooled to form a 3 mm-thick press sheet having a surface luster. The degree of yellowness of the sheet was measured by an automatic recording color differential meter in accordance with the reflecting light method set forth in JIS K7103.

Gas-impermeability

A 0.02 mm-thick film of the sample polymer was prepared by an inflation method, and tested for oxygen permeability in accordance with the method of ASTM D1434-63.

Table 6

| Run No. | Resin composition Resinous polymer (A) | Resin composition Graft copolymer (B) | Weight of the blow bottle (g) | Height which caused 50% break of blow bottles (cm, 5° C) | Processability (° C) | Color (yellowness) | Oxygen permeability (cc/cm$^2$ sec. cm Hg) |
|---|---|---|---|---|---|---|---|
| Invention | | | | | | | |
| 4 | A-(1) | B-(1) | 16.7 | 220 | 160 | 24 | 7.5 × 10$^{-13}$ |
| 5 | A-(1) | B-(4) | 16.5 | 180 | 158 | 22 | 8.0 × 10$^{-13}$ |
| 6 | A-(2) | B-(5) | 16.7 | 160 | 162 | 23 | 7.0 × 10$^{-13}$ |
| Comparison | | | | | | | |
| 8 | A-(3) | B-(3) | 16.8 | 60 | 165 | 42 | 6.5 × 10$^{-13}$ |
| 9 | — | B-(6) | 22.0 | 40 | 203 | 58 | 8.0 × 10$^{-13}$ |

Table 6 shows that the height which caused 50% breakage of the blow bottles of this invention is large and the bottles have high impact strength. In contrast, the height is low with the comparison samples, and these samples have low practical applicability.

Furthermore, it is seen that the graft-blend type resins have a lower melt viscosity than the graft-type resin (comparison Run No. 9), and have superior processability.

Generally, oxygen permeabilities of less than $10^{-11}$ cc/cm$^2$ sec. cm Hg are rated "low" oxygen permeabilities. Thus, the samples in accordance with this invention have satisfactory oxygen-impermeability for practical application.

EXAMPLE 4

1. Preparation of Graft Copolymer (B)

An autoclave was charged with 100 parts of each of the monomeric mixtures shown in Table 7, 100 parts of the acrylonitrile-butadiene rubbery copolymer (as the solids content of the latex) set forth in (1) of Example 1, 0.3 part of t-dodecyl mercaptan, 0.8 part of sodium laurylsulfate, 0.2 part of anhydrous sodium pyrophosphate, 0.08 part of potassium persulfate and 600 parts of water. With stirring in an atmosphere of nitrogen, the graft copolymerization was performed at 55° C for 16 hours. A good graft copolymer latex was obtained in each run. The final conversion of each monomeric mixture is also shown in Table 7.

Table 7

| Graft copolymer (B) | B-(7) | B-(8) | B-(9) |
|---|---|---|---|
| Monomeric mixture | | | |
| Acrylonitrile | 75 | 75 | 75 |
| Methyl acrylate | 20 | 20 | 25 |
| Lauryl methacrylate | 5 | — | — |
| Stearyl methacrylate | — | 5 | — |
| Final conversion of the monomeric mixture (%) | 91 | 90 | 91 |
| Ratio of the rubbery copolymer to the grafting monomeric mixture | 50/50 | 50/50 | 50/50 |

2. Preparation of a Graft-Type Acrylonitrile Resin as a Comparison [B-(10)]

An autoclave was charged with 10 parts of a monomeric mixture consisting of 75 parts of acrylonitrile, 20 parts of methyl acrylate and 5 parts of lauryl methacrylate, 15 parts of the acrylonitrile-butadiene rubbery copolymer (as the solids content of the latex) set forth in (1) above, 1.5 parts of n-dodecyl mercaptan, 0.8 part of sodium laurylsulfate, 0.2 part of anhydrous sodium pyrophosphate, 0.08 part of potassium persulfate and 345 parts of water. With stirring in an atmosphere of nitrogen, the polymerization was carried out at 55° C for 16 hours to afford a good polymer latex (the ratio of the rubbery copolymer/grafting monomeric mixture=13/87) with a final conversion of 95%.

3. Preparation of the Resin Compositions and Testing of the Compositions for Alcohol Resistance, Impact Strength and Gas-Impermeability The resinous polymer (A) latices set forth in (2) of Example 1 and the graft copolymer (B) latices set forth in (1) above were mixed in the combinations shown in Table 8 so that the content of the rubbery copolymer was 13% by weight of the resin composition obtained (solids content). Each of the mixed latices was salted out with a 0.4% aqueous solution of aluminum sulfate. The polymer was separated by filtration, washed with water, and dried at 60° C for 48 hours to afford a white powdery polymer.

Separately, the polymer latex B-(10) alone was similarly salted out, filtered, washed with water, and dried to afford a white powdery polymer.

Each of the white powdery polymers obtained was melt-kneaded for 3 minutes by a heated roll at 160° C to form a rolled sheet. The rolled sheet was pre-heated for 5 minutes and pressed for 5 minutes by a heated press held at 170° C, and then cooled to afford a 1 mm-thick sheet having a surface luster.

The press sheets were each tested for alcohol resistance and gas-impermeability.

Test pieces specified in JIS-K-6911-1962 were prepared, and the notched Izod impact strengths at 23° C of the test pieces were measured.

The test results are shown in Table 8.

Table 8

| Run No. | Resin composition Resinous polymer (A) | Graft copolymer (B) | Results of test for alcohol resistance Transmittance before dipping [X] (%) | Transmittance after dipping [Y] (%) | [Y]/[X] × 100 (%) | Izod impact strength (notched) (kg.cm/cm$^2$) | Oxygen permeability (cc/cm$^2$ sec. cm Hb) |
|---|---|---|---|---|---|---|---|
| Invention | | | | | | | |
| 7 | A-(1) | B-(8) | 82 | 72 | 87.8 | 5.2 | 6.3 × 10$^{-13}$ |
| 8 | A-(2) | B-(7) | 83 | 73 | 88.0 | 6.4 | 6.5 × 10$^{-13}$ |
| 9 | A-(1) | B-(9) | 83 | 70 | 84.3 | 5.0 | 6.6 × 10$^{-13}$ |
| Comparison | | | | | | | |
| 10 | A-(3) | B-(9) | 80 | 18 | 22.5 | 4.2 | 6.5 × 10$^{-13}$ |
| 11 | A-(3) | B-(7) | 82 | 23 | 28.0 | 4.7 | 6.6 × 10$^{-13}$ |
| 12 | A-(4) | B-(8) | 83 | 34 | 41.0 | 4.6 | 6.6 × 10$^{-13}$ |
| 13 | A-(5) | B-(7) | 82 | 38 | 46.3 | 4.3 | 6.4 × 10$^{-13}$ |
| 14 | A-(6) | B-(7) | 52 | 24 | 46.1 | 5.0 | 6.7 × 10$^{-13}$ |
| 15 | — | B-(10) | 84 | 70 | 83.3 | 4.1 | 6.4 × 10$^{-13}$ |

The results shown in Table 8 demonstrate that the sheets of Runs Nos. 7, 8 and 9 of the invention have good transparency in the initial stage (before dippint), and have high transmittance values after dipping in the alcohol solution, clearly showing superior alcohol resistance. The sheets of the invention after dipping were transparent by visual observation, and no difference in the degree of transparency could be discerned among them. In contrast, the sheet of comparison Run No. 14 was somewhat cloudy with white spots, and the sheets of the comparison Runs Nos. 10, 11, 12, 13 and 14 after dipping had reduced transmittance values, and were cloudy with white spots by visual observation, thus showing a marked impairment of transparency.

Furthermore, it can be seen from the table that the sheets of Runs Nos. 7, 8 and 9 of the invention have superior impact strength to the sheets of the comparison runs. The sheet of comparison Run No. 14 had impact strength comparable to those of the sheets of the invention, but suffered from extremely reduced alcohol resistance as stated above.

4. Test for Processability and Color

The graft-blend type resin composition in Run No. 7 of the invention [that is, the blend of A-(1) and B-(8)], and the graft-type resin of comparison Run No. 15, B-(10) were tested for melt flow properties (processability) and color.

As stated hereinabove, the test for processability was the measurement of the temperature at which the sample had a melt viscosity of $10^5$ poises, and in the test for color, the yellowness of the sample was measured in accordance with JIS K 7103.

The results are shown in Table 9.

Table 9

| Resin composition | Processability (° C) | Color (yellowness) |
|---|---|---|
| A-(1) plus B-(8) | 165 | 41 |
| B-(10) | 205 | 62 |

What we claim is:

1. An acrylonitrile resin composition capable of affording shaped articles having superior alcohol resistance, impact strength, transparency and gas-impermeability, said composition consisting essentially of
   A. a resinous copolymr obtained by polymerizing a monomeric mixture consisting of
      1. 60 to 90% by weight of acrylonitrile,
      2. 1 to 35% by weight of at least one acrylic monomer selected from the group consisting of alkyl acrylates and alkyl methacrylates with the alkyl group containing 1 to 6 carbon atoms, and
      3. 0.5 to 15% by weight of an alkyl methacrylate with the alkyl group containing 12 to 18 carbon atoms; and
   B. a graft copolymer obtained by polymerizing
      1. 40 to 80 parts by weight of a monomeric mixture consisting of (i) 30 to 90% by weight of acrylonitrile, (ii) 1 to 70% by weight of at least one acrylic monomer selected from the group consisting of alkyl acrylates and alkyl methacrylates with the alkyl group containing 1 to 6 carbon atoms and (iii) 0 to 15% by weight of an alkyl methacrylate with the alkyl group containing 12 to 18 carbon atoms, in the presence of
      2. 20 to 60 parts by weight of a diene-type rubbery polymer composed of at least 50% by weight of a conjugated diene unit and at most 50% by weight of an acrylonitrile unit, the total amount of the diene-type rubbery polymer (2) and the monomeric mixture (1) being 100 parts by weight; the ratio of the resinous copolymer (A) to the graft copolymer (B) being such that the content of the diene-type rubber polymer used to prepare the graft copolymer (B) being 3 to 20% by weight based on the weight of the composition.

2. An acrylonitrile resin composition capable of affording shaped articles having superior alcohol resistance, impact strength, transparency and gas-impermeability, said composition consisting essentially of
   A. a resinous copolymer obtained by polymerizing a monomeric mixture consisting of
      1. 65 to 85% by weight of acrylonitrile,
      2. 5 to 30% by weight of at least one acrylic monomer selected from the group consisting of alkyl acrylates and alkyl methacrylates with the alkyl group containing 1 to 6 carbon atoms, and
      3. 1 to 10% by weight of an alkyl methacrylate with the alkyl group containing 12 to 18 carbon atoms; and
   B. a graft copolymer obtained by polymerizing
      1. 40 to 60 parts by weight of a monomeric mixture consisting of (i) 35 to 55% by weight of acrylonitrile, (ii) 45 to 65% by weight of at least one acrylic monomer selected from the group consisting of alkyl acrylates and alkyl methacrylates with the alkyl group containing 1 to 6 carbon atoms and (iii) 0 to 10% by weight of an alkyl methacrylate with the alkyl group containing 12 to 18 carbon atoms, in the presence of
      2. 40 to 60 parts by weight of a diene-type rubbery polymer composed of at least 50% by weight of a conjugated diene unit and at most 50% by weight of an acrylonitrile unit, the total amount of the diene-type rubbery polymer (2) and the monomeric mixture (1) being 100 parts by weight; the ratio of the resinous copolymer (A) to the graft copolymer (B) being such that the content of the diene-type rubbery polymer used to prepare the graft copolymer (B) being 5 to 20% by weight based on the weight of the composition.

3. The composition of claim 1 wherein the alkyl acrylate is methyl acrylate.

4. The composition of claim 1 wherein the alkyl methacrylate with the alkyl group containing 12 to 18 carbon atoms is lauryl methacrylate.

5. The composition of claim 1 wherein the alkyl methacrylate with the alkyl group containing 12 to 18 carbon atoms is stearyl methacrylate.

6. The composition of claim 1 wherein the conjugated diene unit is butadiene.

7. The composition of claim 1 wherein the diene-type rubbery polymer is an acrylonitrile-butadiene rubbery copolymer.

* * * * *

UNITED STATES PATENT OFFICE
CERTIFICATE OF CORRECTION

Patent No. 4,061,693　　　　　　　　　Dated December 6, 1977

Inventor(s) SHIGEMITSU KAMIYA

It is certified that error appears in the above-identified patent and that said Letters Patent are hereby corrected as shown below:

Item 30, please insert the following Foreign Application Priority Data:

-- April 26, 1976　Japan ............... 51-47483
　 April 26, 1976　Japan ............... 51-47484 --

Signed and Sealed this

Sixteenth Day of May 1978

[SEAL]

Attest:

RUTH C. MASON　　　　　　　LUTRELLE F. PARKER
Attesting Officer　　　Acting Commissioner of Patents and Trademarks